(12) United States Patent
Ballesteros et al.

(10) Patent No.: US 9,032,478 B2
(45) Date of Patent: May 12, 2015

(54) MANAGING SECURITY IN A NETWORK

(75) Inventors: Rebecca M. Ballesteros, Roseville, CA (US); Sherry Krell, Sacramento, CA (US); Adrian Cowham, Fair Oaks, CA (US); John M. Green, Rocklin, CA (US); Ramachandra Yalakanti, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 13/146,112

(22) PCT Filed: Jan. 29, 2009

(86) PCT No.: PCT/US2009/032501
§ 371 (c)(1),
(2), (4) Date: Jul. 25, 2011

(87) PCT Pub. No.: WO2010/087838
PCT Pub. Date: Aug. 5, 2010

(65) Prior Publication Data
US 2011/0289557 A1    Nov. 24, 2011

(51) Int. Cl.
*G06F 15/16* (2006.01)
*G06F 17/30* (2006.01)
*H04L 29/06* (2006.01)
*G06F 21/00* (2013.01)
*H04L 9/32* (2006.01)
(Continued)

(52) U.S. Cl.
CPC .............. *H04L 63/20* (2013.01); *G06F 21/554* (2013.01); *G06F 21/56* (2013.01); *H04L 63/102* (2013.01); *H04L 63/107* (2013.01); *H04L 2463/146* (2013.01); *H04L 63/1416* (2013.01); *H04L 63/1441* (2013.01)

(58) Field of Classification Search
CPC ............ G06F 21/00; G06F 17/00; H04L 9/32
USPC ................ 726/3, 1, 13, 22–33; 713/153–154, 713/187–188, 193–194; 709/206, 249, 389
See application file for complete search history.

(56) References Cited

U.S. PATENT DOCUMENTS

2006/0037075 A1*   2/2006   Frattura et al. .................. 726/22
2006/0150238 A1*   7/2006   D'Agostino ..................... 726/1
(Continued)

FOREIGN PATENT DOCUMENTS

EP        1742438           1/2007
KR    10-2006-0017109       2/2006

OTHER PUBLICATIONS

Extended European Search Report, Apr. 24, 2013, EP Patent Application No. 09839411.7.
(Continued)

*Primary Examiner* — Evans Desrosiers
(74) *Attorney, Agent, or Firm* — HP Patent Department

(57) ABSTRACT

A method of managing security in a network is described. A data anomaly at a first location on a network is detected. A source of this data anomaly is identified. The source is compared with a plurality of access control policies, wherein each of the plurality of access control policies comprises at least one access restriction instruction associated with one or more sources. Based on the comparing, the source is associated with a corresponding one of the plurality of access control policies.

14 Claims, 5 Drawing Sheets

(51) Int. Cl.
*G06F 21/55* (2013.01)
*G06F 21/56* (2013.01)

(56) References Cited

U.S. PATENT DOCUMENTS

| | | | |
|---|---|---|---|
| 2006/0174342 A1* | 8/2006 | Zaheer et al. | 726/23 |
| 2007/0033650 A1 | 2/2007 | Grosse et al. | |
| 2007/0110069 A1 | 5/2007 | Lim et al. | |
| 2007/0150934 A1 | 6/2007 | Fiszman et al. | |
| 2007/0157306 A1 | 7/2007 | Elrod et al. | |
| 2007/0192862 A1* | 8/2007 | Vermeulen et al. | 726/23 |
| 2007/0214352 A1 | 9/2007 | Convery et al. | |
| 2008/0235755 A1* | 9/2008 | Blaisdell et al. | 726/1 |

OTHER PUBLICATIONS

Damianou et al. 'The Ponder Policy Specification Language'. Proc. Policy 5-8, 14, 15 2001: Workshop on Policies for Distributed Systems and Networks, Bristol, UK, Jan. 29-31, 2001.

International Search Report, PCT/US2009/032501, Jul. 28, 2009.

* cited by examiner

MANAGING SECURITY IN A NETWORK

FIELD

The field of the present invention relates to computing systems. More particularly, embodiments of the present invention relate to network security management.

BACKGROUND

Technological advances have led to the use of increasingly larger and complex networks with an ever increasing number of network systems as an integral part of organizational operations. Many network systems routinely receive, process and/or store data of a sensitive and/or confidential nature. Users are often provided with access to a network via external network access points to retrieve and/or exchange data with network systems within the network. The increased use of such external network access points has in many cases rendered networks increasingly vulnerable to attacks by malicious users.

Attacks on networks are growing in frequency and sophistication. The sensitive nature of data that is routinely stored in such networks often attracts malicious users or hackers that seek to gain access to the sensitive data and/or confidential data. In some cases, malicious users seek access to networks and network systems with the intention of corrupting the network and/or network systems. Examples of mechanisms that are often used by malicious users to inflict damage on a network include, but are not limited to, viruses, worms, spiders, crawlers and Trojans.

The increasing frequency of attacks on networks has often led to an increase on the demands made on network administrators to detect, assess, and respond to detected network data anomalies in a timely manner.

BRIEF DESCRIPTION OF THE DRAWINGS

The accompanying drawings, which are incorporated in and form a part of this specification, illustrate embodiments of the present technology for a system for managing security in a network and, together with the description, serve to explain principles discussed below.

Figure 1:
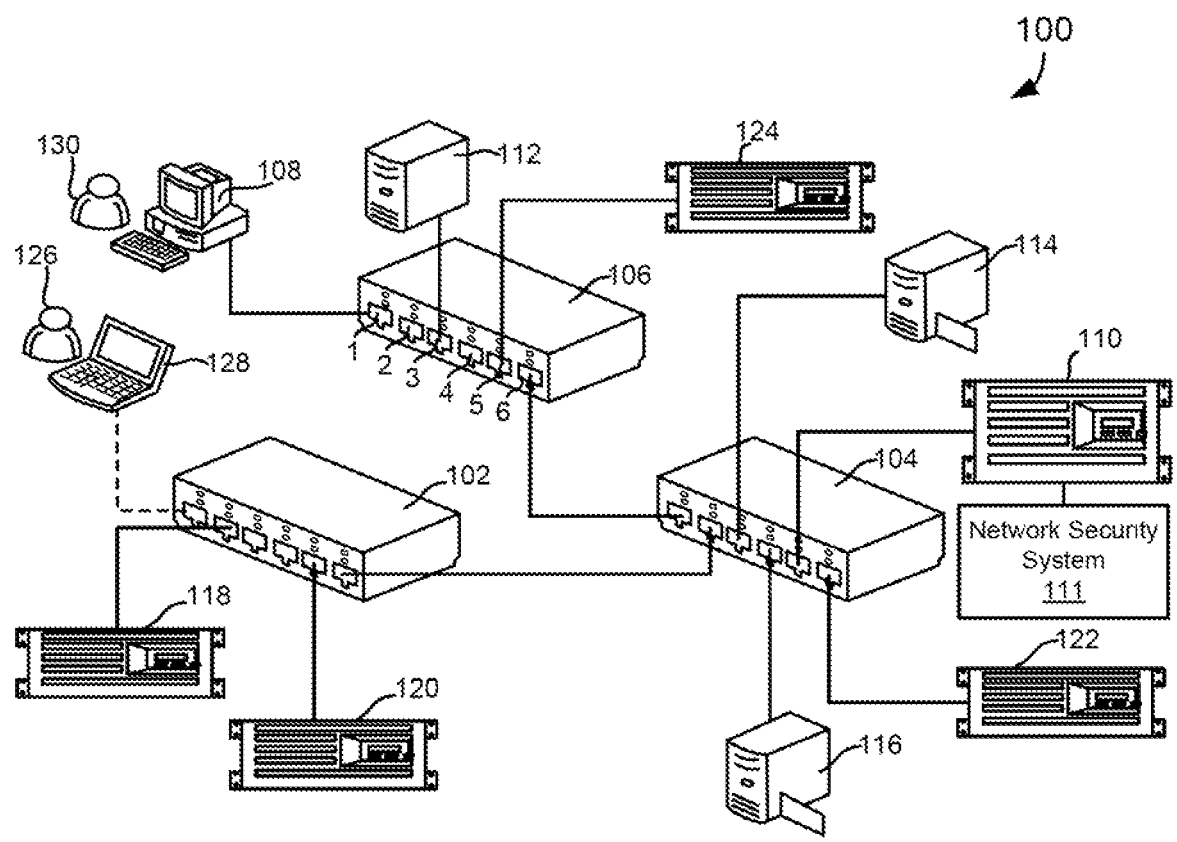
FIG. 1 is a block diagram of an example network in which a network security system may be implemented, in accordance with embodiments of the present technology.

The drawings referred to in this description should not be understood as being drawn to scale unless specifically noted.

Description of Embodiments

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "detecting", "identifying", "comparing", "associating", "mapping", "determining", "enabling", "replacing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments in accordance with the present technology pertain to a system for managing security in a network and its usage. In one embodiment in accordance with the present technology, the system described herein enables the prevention of disruptive network traffic, such as but not limited to, viruses, worms, spiders, crawlers, and Trojans. More particularly, the system detects disruptive network traffic at a first network location, identifies the source of the disruptive network traffic, and restricts the source's ability to circumvent the security system and re-enter the network at a second network location.

For example, a user logs into the local network via the user's desktop computer and a first port. However, unbeknownst to the user, a worm has infiltrated the desktop computer. As the user finishes downloading emails, the worm has already begun its work of creating network bandwidth issues, thereby disrupting local network traffic. In one instance, a network management system detects the intrusion of the worm and takes mitigation measures, such as denying the user access to the local network via the first port. In response to experiencing trouble accessing the local network via the first port, the user unplugs his desktop computer from the first port and plugs it into a second port. The user then attempts to log into the local network via the second port.

However, embodiments of the present technology provide that the user's access to the local network via the second port may also be restricted, based on the identification of the user's network address while using the first port as well as an access control policy associated with the user. For example, the worm was detected at user's desktop computer via port 1 of the local network. The source of the worm was identified, a.k.a., the user's network address. Additionally, an access control policy may provide that the identified user network address associated with the data anomaly is to be denied access to the entire local network, regardless of which network port may be used. Thus, based on the user's network address and the related access control policy, the user is also denied access to the local network via the second port.

Therefore, embodiments of the present technology manage security in a network by applying automated preventative measures to avoid re-entry into a network at a location by a previously recognized disruptive source. In other words, embodiments of the present technology provide a method for preventing a user from circumventing mitigation measures responsive to network traffic disruptions traced to a first network location, such preventative measures including blocking the user from re-entering the network at a second network location.

Managing Security in a Network

FIG. 1 is a block diagram representation of an example of a network 100 where one embodiment of managing security in a network 100 may be implemented is shown. The example network 100 generally includes first, second and third network switch systems 102, 104, 106, a network administrator system 108, a network management system 110, first, second and third server systems 112, 114, 116, and first, second, third and fourth threat assessment systems 118, 120, 122, 124. An external system 128, such as a laptop, is communicatively coupled with network 100.

First, second and third network switch systems 102, 104, 106 are communicatively coupled with each other and generally communicatively coupled with network 100. Each of first, second and third network switch systems 102, 104, 106, respectively, includes a plurality of data ports 1, 2, 3, 4, 5, 6. Communicative coupling is established between first network switch system 102 and second network switch system 104 via a communication channel between data port 6 of first network switch system 102 and data port 2 of second network switch system 104. Communicative coupling is established between second network switch system 104 and third network switch system 106 via a communication channel between data port 1 of second network switch system 104 and data port 6 of third network switch system 106.

In one embodiment, one or more network switch systems 102, 104, 106 includes one or more edge interconnect data ports. Data port 1 of first network switch system 102 is communicatively coupled with external system 128 and is an example of an edge interconnect data port. In one embodiment, one or more network switch systems are configured as edge interconnect network switch systems where the data ports 1, 2, 3, 4, 5, 6 are all configured as edge interconnect data ports.

In one embodiment, one or more network switch systems 102, 104, 106 includes an embedded threat assessment system in the form of a switch based trap system. The switch based trap system is configured to detect one or more selected data anomalies and raises a data anomaly event upon detection of the one of the selected data anomalies. In one embodiment, the switch based trap system issues an anomaly notification to network management system 110 upon detection of one of the selected data anomalies. In one embodiment, the switch based trap system issues an anomaly notification to network administrator system 108 upon detection of one of the selected data anomalies. In one embodiment, the switch based trap system is a virus throttling (VT) system.

In one embodiment, one or more data ports, 1, 2, 3, 4, 5, 6 of one or more of network switch systems 102, 104, 106 are configured as mirror source ports. In one embodiment, one or more data ports 1, 2, 3, 4, 5, 6 of one or more network switch systems 102, 104, 106 are configured as mirror destination ports. In one embodiment, one or more data ports 1, 2, 3, 4, 5, 6 of one or more network switch systems 102, 104, 106 are configured as local mirror source ports. In one embodiment, one or more data ports 1, 2, 3, 4, 5, 6 of one or more network switch systems 102, 104, 106 are configured as local mirror destination ports. In one embodiment, one or more data ports 1, 2, 3, 4, 5, 6 of one or more network switch systems 102, 104, 106 are configured as remote mirror source ports. In one embodiment, one or more data ports 1, 2, 3, 4, 5, 6 of one or more network switch systems 102, 104, 106 are configured as remote mirror destination ports.

While network switch systems having six data ports have been described, network switch systems used in a network may have a fewer or a greater number of data ports. For example, many network switch systems have well over 100 data ports. Also, while a number of different types of network switch systems having the described configurations and/or features have been described, the network switch systems may be configured using alternative network switch system configurations and/or features. Furthermore, while a network has been described as having three network switch systems, a fewer or greater number of network switch systems may be used.

Threat assessment systems 118, 120, 122, 124 generally monitor network data to identify data anomalies that may pose a security threat to network 100 and evaluate any identified data anomalies. In one embodiment, threat assessment system 118, 120, 122, 124 implements mitigation actions in response to the detection of a data anomaly that may pose a potential security threat to network 100. There are a number of different types of threat assessment systems 118, 120, 122, 124 available for use in network 100. Examples of such threat assessment systems 118, 120, 122, 124, include but are not limited to, intrusion detection systems (IDS), intrusion prevention systems (IPS), unified threat management (UTM) systems and firewall systems (FW). In an example network 100, first and third threat assessment systems 118 and 122, respectively, are intrusion detection systems (IDS), second threat assessment system 120 is an intrusion prevention system (IPS), and fourth threat assessment system 124 is a unified threat management (UTM) system.

First and second threat assessment systems 118 and 120, respectively, are communicatively coupled with network 100 via first network switch system 102 and third and fourth threat assessment systems 122 and 124, respectively, are communicatively coupled to network 100 via second and third network switch systems 104 and 106, respectively. More specifically, first threat assessment system 118 is communicatively coupled with network 100 via a communication channel between first threat assessment system 118 and data port 2 of first network switch system 102. Second threat assessment system 120 is communicatively coupled with network 100 via a communication channel between second threat assessment system 120 and data port 5 of first network switch system 102. Third threat assessment system 122 is communicatively coupled with network 100 via a communication channel between third threat assessment system 122 and data port 6 of second network switch system 104. Fourth threat assessment system 124 is communicatively coupled with network 100 via a communication channel between fourth threat assessment system 124 and data port 5 of third network switch system 106.

In one embodiment, one or more threat assessment systems 118, 120, 122, 124 issues an anomaly event notification to network administrator system 108 upon the detection of selected data anomalies. In one embodiment, one or more threat assessment systems 118, 120, 122, 124 issues an evaluation notification to network administrator system 108 upon completion of an evaluation of a detected data anomaly. In one embodiment, one or more threat assessment systems 118, 120, 122, 124 issues an anomaly event notification to network management system 110 upon the detection of a data anomaly. In one embodiment, one or more threat assessment systems 118, 120, 122, 124 issues an evaluation notification to network management system 110 upon completion of an evaluation of a detected data anomaly.

While a number of different types of threat assessment systems have been described, other types of threat assessment systems may be used. Also, while a network has been described as having four threat assessment systems, a fewer or greater number of threat assessment systems may be used. Furthermore, while a particular network configuration has been described for the threat assessment systems, alternative network configurations may be employed.

In one embodiment, upon the detection of selected data anomalies by network management system 110, network management system 110 issues a data anomaly assessment request to a selected threat assessment system 118, 120, 122, 124 to provide an assessment of the detected data anomaly. In one embodiment, upon the detection of selected data anomalies by network management system 110, network management system 110 issues a data mirroring command to a selected network system to mirror network data associated with the detected data anomaly to a selected threat assessment system 118, 120, 122, 124. In one embodiment, upon the detection of selected data anomalies by network management system 110, network management system 110 identifies the threat type posed by the detected network data anomaly, identifies a threat assessment system 118, 120, 122, 124 that specializes in the evaluation of an identified threat type and issues a data mirroring command to a selected network system to mirror network data associated with the data anomaly to the identified threat assessment system 118, 120, 122, 124.

Network management system 110 generally manages network operations including network security operations. In one embodiment, network management system 110 includes a network immunity management system where the network immunity management system generally manages network security operations. In one embodiment, network management system 110 is a network immunity management (NIM) system type of network management system that generally manages network security operations. Additional types of network management systems are used to manage other types of network operations. In one embodiment, network management system 110 includes an embedded threat assessment system. In one embodiment, the embedded threat assessment system is a network behavior anomaly detection (NBAD) system. Network management system 110 is communicatively coupled with network 100 via second network switch 104. More specifically, network management system 110 is communicatively coupled with network 100 via a communication channel between network management system 110 and data port 5 of second network switch system 104. Network management system 110 will be described in greater detail with reference to FIG. 2 below.

Network administrator 130 generally manages network operations including network security operations via network administrator system 108. Network administrator system 108 is communicatively coupled with network 100 via third network switch 106. More specifically, network administrator system 108 is communicatively coupled with network 100 via a communication channel between network administrator system 108 and data port 1 of third network switch system 106.

In one embodiment, network administrator 130 is provided with the option of manually defining and/or amending security policies via network administrator system 108. In one embodiment, anomaly notifications are received at network administrator system 108. In one embodiment, network administrator 130 is provided with the option of selectively manually enforcing selected security polices via network administrator system 108. In one embodiment, network administrator 130 is provided with the option of selectively manually implementing one or more mitigation responses to selected data anomalies via network administrator system 108. In one embodiment, network administrator 130 is provided with the option of configuring selected network systems via network administrator system 108.

In one embodiment, network administrator 130 is provided with the option of configuring individual network switch systems 102, 104, 106 via network administrator system 108. In one embodiment, network administrator 130 is provided with the option of configuring individual data ports 1, 2, 3, 4, 5, 6 of individual network switch systems 102, 104, 106 via network administrator system 108. In one embodiment, network administrator 130 is provided with the option of configuring individual data ports 1, 2, 3, 4, 5, 6 as mirror source data ports and as mirror destination data ports via network administrator system 108. In one embodiment, network administrator 130 is provided with the option of configuring individual data ports 1, 2, 3, 4, 5, 6 as local mirror source data ports and as local mirror destination data ports via network administrator system 108. In one embodiment, network administrator 130 is provided with the option of configuring individual data ports 1, 2, 3, 4, 5, 6, as remote mirror source data ports and as remote mirror destination data ports via network administrator system 108. While a number of different network administrations functions that may be performed by network administrator 130 via network administrator system 108 have been described, other network administrations functions may also be performed by network administrator 130 via network administrator system 108.

First server system 112 is communicatively coupled with network 100 via third network switch 106 and second and third server systems 114 and 116, respectively, are communicatively coupled with network 100 via second network switch 104. More specifically, first server system 112 is communicatively coupled with network 100 via a communication channel between first server system 112 and data port 3 of third network switch system 106. Second server system 114 is communicatively coupled with network 100 via a communication channel between second server system 114 and data port 3 of second network switch system 104. Third server system 116 is communicatively coupled with network 100 via a communication channel between third server system 116 and data port 4 of second network switch system 104. In the example network 100, first server system 112 handles data requiring a relatively low level of network security while second and third server systems 114 and 116, respectively, handle relatively sensitive financial data and require a relatively higher level of network security. While one network configuration including specific types of server systems configured within the network in a particular manner have been described, other types of server systems may be used in a network. Also, while one network configuration of server systems has been described alternative network configurations may be used. Furthermore, while three servers have been described as a part of the network, a fewer or greater number of servers may be used.

A user 126 has used external system 128, such as a laptop, to establish communicative coupling with network 100. External system 128 has established communicative coupling with network 100 via a communication channel established between external system 128 and data port 1 of first network switch system 102. Data port 1 is an edge interconnect data port. A user as used in the description includes human users as well as automated agents. One example of such an automated agent is a bot.

In one embodiment, communication channels established between network systems within network 100 are wireless communication channels. In one embodiment, communication channels established between network systems within network 100 are wired communication channels. In one embodiment, communication channels established between network systems within network 100 are a combination of wireless communication channels and wired communication channels.

In one embodiment, communication channels established between external system 128 and network 100 are via wireless communication channels. In one embodiment, communication channels established between external system 128 and network 100 are via wired communication channels. In one embodiment, communication channels established between external system 128 and network 100 are via a combination of wireless communication channels and wired communication channels.

While one particular configuration of network 100 where one embodiment of managing security in network 100 may be implemented has been described, embodiments of managing security in a network may be implemented in networks having alternative configurations. Furthermore, embodiments of managing security in a network may be implemented in networks including a fewer or greater number of types of network systems and including a fewer or greater number of the described network systems.

Example Architecture of Network Security System

Figure 2:
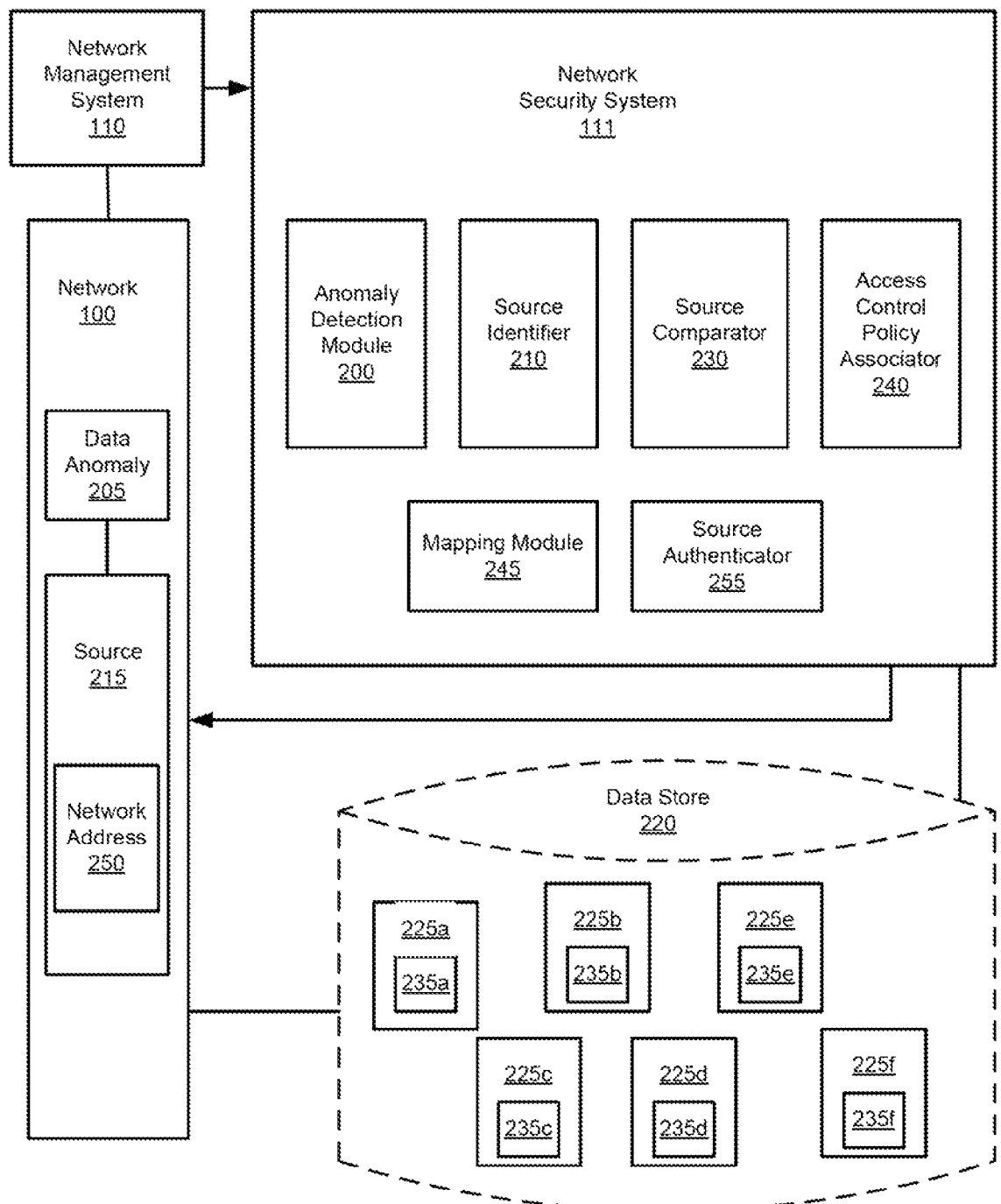
FIG. 2 is a block diagram of an example network security system, in accordance with embodiments of the present technology.

FIG. 2 is a block diagram of an example network security system (NSS) 111, in accordance with embodiments of the present technology. NSS 111 is coupled with, wired and/or wirelessly, network management system 110 and network 100. NSS 112 includes anomaly detection module 200, source identifier 210, data store 220, source comparator 230, and access control policy associator 240. Embodiments of the present technology may further include mapping module 245 and source authenticator 255.

In one embodiment, anomaly detection module 200 is coupled with, wired and/or wirelessly, the threat assessment system embedded within one or more network switch systems 102, 104, and 106 described herein.

FIG. 2 shows network 100 comprising source 215 and data anomaly 205. Source 215 refers to the origination of a detected data anomaly 205. For example, source 215 is a mechanism used to access a network, and may include a computer only or a computer and its operator. Source 205 comprises network address 250. Network address 250 is recognizable by NSS 111, and may be used to locate the access control policy that applies to source 215, as will be described herein.

In one embodiment, data store 220 stores comprises a plurality of access control policies 225a, 225b, 225c, 225d, 225e, and 225f (225a-225f). Data store 220 may be internal to or external to NSS 112. In one embodiment, data store 220 is coupled with but external to network 100 described herein.

While a plurality of access control policies, 225a-225f, is shown in FIG. 2, for purposes of brevity and clarity, only one access control policy, 225a, will be discussed herein. Furthermore, while a limited number of access control policies, 225a-225f, are shown in FIG. 2, it is understood that there may be as many access control policies in data store 220 that data store 220 is capable of storing. It is also understood that the description of access control policy 225a will be representative of all access control policies.

Access control policy 225a comprises at least one access restriction instruction 235a associated with source 205. While only one access restriction instruction 235a is described herein, it is understood that access control policy 225a may contain more than on access restriction instruction. Access restriction instruction 235a includes a description regarding instructions limiting a source's access to a certain location within a network.

In one embodiment, access restriction instruction 235a may be a network location restriction for source 215. For example, access restriction instruction 235a may indicate that source 215 is only permitted access to ports 5 and 6 of the ports 1, 2, 3, 4, 5, and 6. In another embodiment, access restriction instruction 235a may be a network bandwidth restriction. For example, access restriction instruction 235a may indicate that source 215 is only permitted to use a pre-specified amount of bandwidth at all ports 1, 2, 3, 4, 5, and 6 on network 100. In one embodiment, access restriction instruction 235a may be a duration restriction for source 215. For example, access restriction instruction 235a may indicate that source 215 is only permitted access to network 100 via port 1 for two minutes a day.

As will be described herein, embodiments of the present technology provide a mechanism for detecting anomalous or harmful behavior by users and/or machines and to temporarily or permanently restrict future access rights to the network in order to prevent continued harmful behavior.

Example Operation of Network Security System

More generally, in embodiments in accordance with the present technology, NSS 111 is utilized to recognize the source of a network attack at a first location and restrict this source's access to the network at another network location. Such a method of managing access to a network is particularly useful in preventing a user responsible for disruptive network traffic from re-entering the network at a second location and causing more disruption.

Referring still to FIG. 2, anomaly detection module 200 is configured to detect data anomaly 205 at a first location on network 100. First location on network 100 may be any location within network 100 that a data anomaly may be detected, such as but not limited to, ports 1, 2, 3, 4, 5, and/or 6.

In one embodiment, source identifier 210 is configured to identify a source 215 of data anomaly 205. In one embodiment, mapping module 245 is configured to map source 215 to an associated network address via technology known in the field.

In one embodiment, source authenticator 255 is configured to determine a role associated with source 215. In one embodiment, the term, "role", refers to source 215's pre-defined function within network 100, which function corresponds to a source 215's level of access permitted to various locations within network 100. For example, source authenticator 255 recognizes source 215 via source's 215 network address 250, and determines source's pre-defined role within network 100. This role may be that of a "manager". A manager in the corporation may typically be permitted a high level of access at various locations within the network.

In one embodiment, source comparator 230 compares source 215 with plurality of access control policies 225a-225f, wherein each of plurality of access control policies 225a-225f comprises at least one access restriction instruction 235a-235f associated with one or mores sources, such as source 215.

In one embodiment, access control policy associator 240 is configured for associating source 215 with a corresponding one of the plurality of access control policies 225a-225f based on source comparator 230's comparison described herein. An access control policy that is "corresponding" with source 215 may be one that references source 215's pre-defined "role" and/or source's network address. Associating source 215 with the corresponding access control policy 225a may entail communicating this corresponding access control policy 225a to network 100 and an administrator therein. Additionally, access control policy 225a may become temporarily associated with source 215 or permanently associated with source 215.

In one embodiment, network 100 may be programmed to automatically replace the current access control policy regarding source 215 with the access control policy 225a. In another embodiment, network 100 and/or any administrator thereof may receive access control policy 225a for examination before determining whether or not to implement it.

Figure 3:
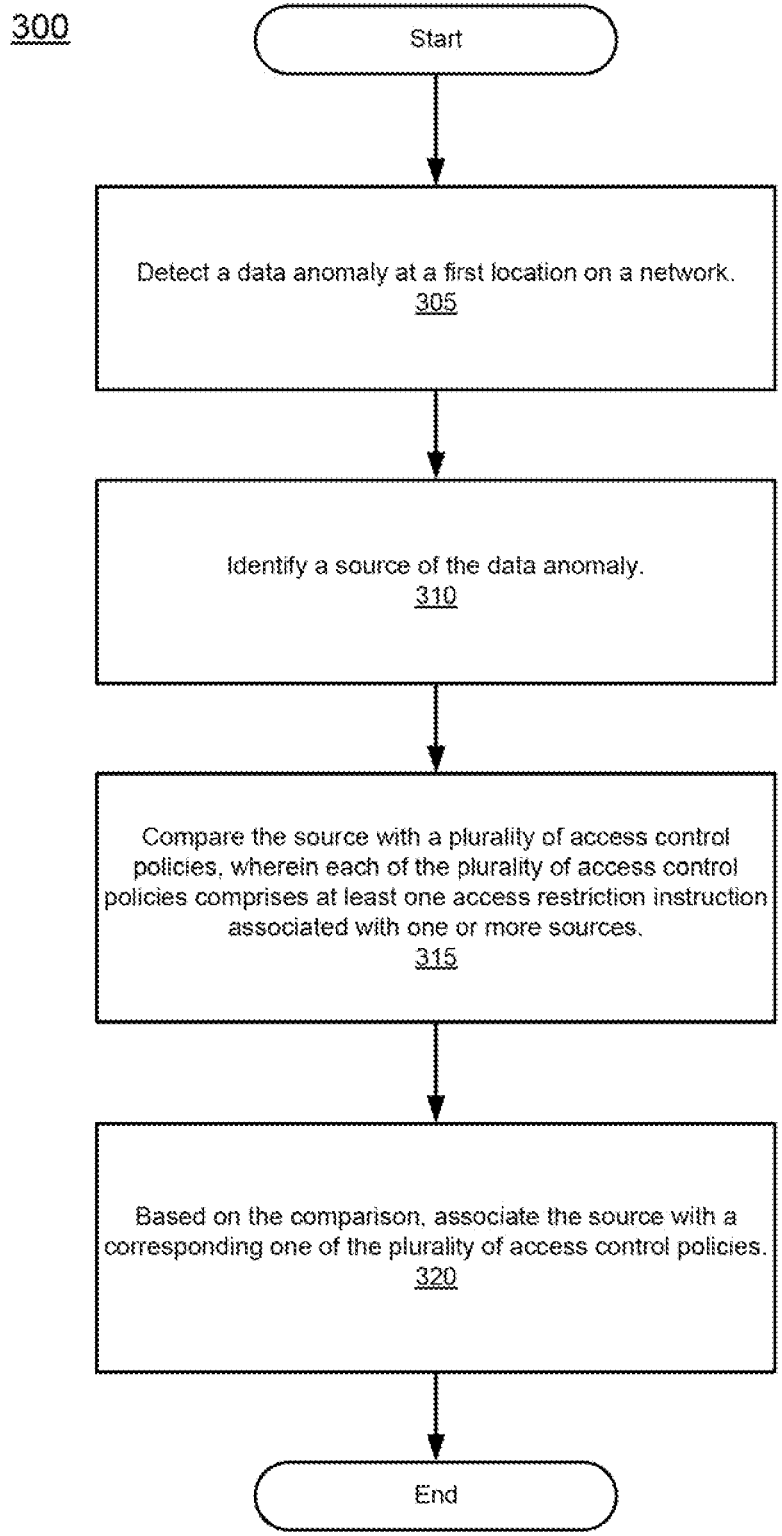
FIG. 3 is a flowchart of an example computer-implemented method of managing security in a network, in accordance with embodiments of the present technology.

Referring now to 300 of FIG. 3, a flowchart of an example computer-implemented method of managing security in network 100, in accordance with embodiments of the present technology is shown.

Referring to 305 of FIG. 3 and as described herein, in one embodiment of the present technology, data anomaly 205 is detected at a first location on network 100. Referring now to 310 of FIG. 3 and as described herein, in one embodiment source 205 of data anomaly 205 is identified.

Referring to 315 of FIG. 3 and as described herein, in one embodiment, source 205 is compared with a plurality of access control policies 225a-225f, wherein each of plurality of access control policies 225a-225f comprises at least one access restriction instruction 235a-235f associated with one or more sources, such as but not limited to, source 205. Referring now to 320 of FIG. 3 and as described herein, in one embodiment, based on the comparing of 315 of FIG. 3, source 205 is associated with a corresponding one of plurality of access control policies 225a-225f.

Example Computer System Environment

Figure 4:
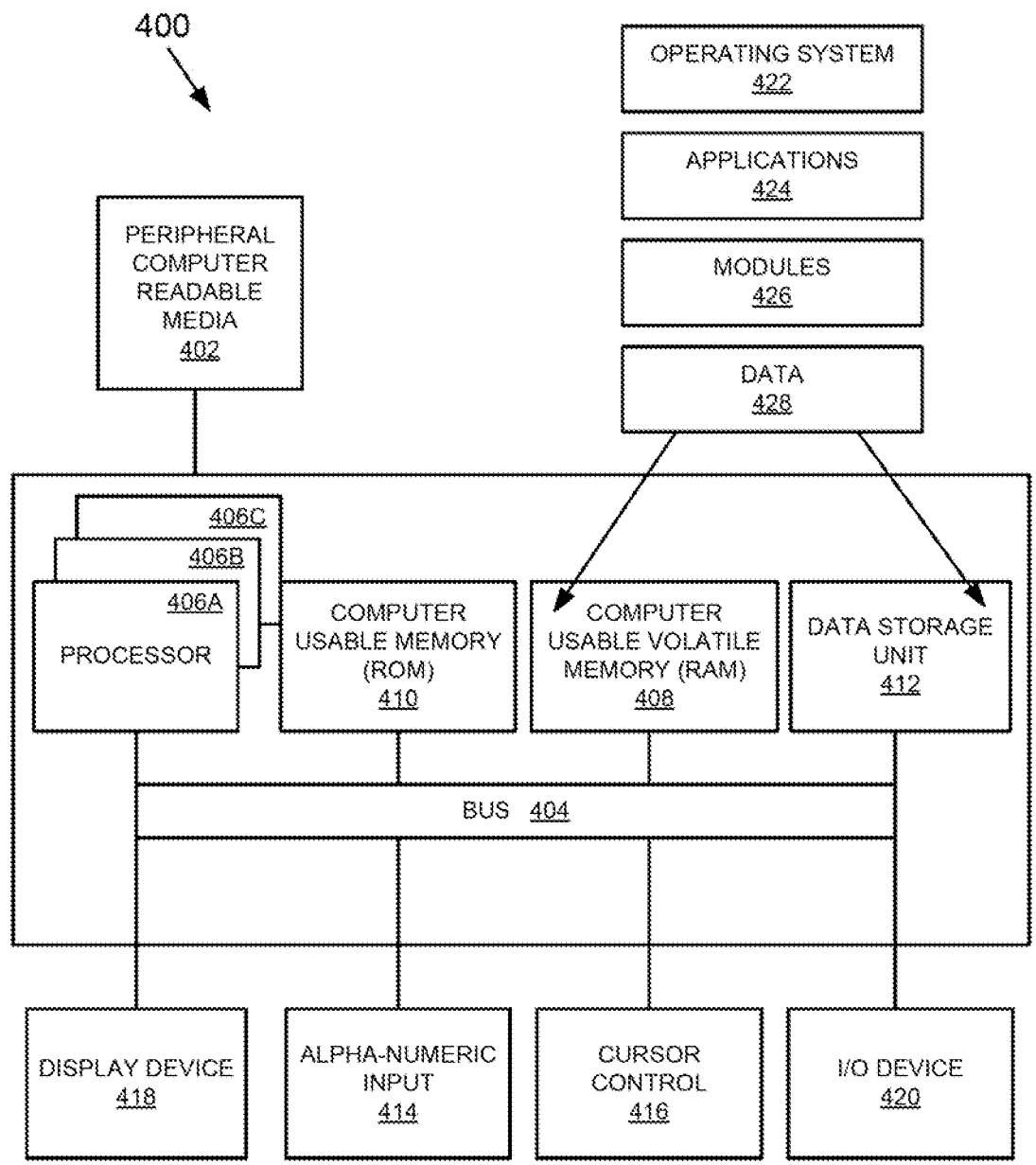
FIG. 4 is a diagram of an example computer system used for managing security in a network, in accordance with embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 4068, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 614 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of embodiments of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer.

Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Figure 5:
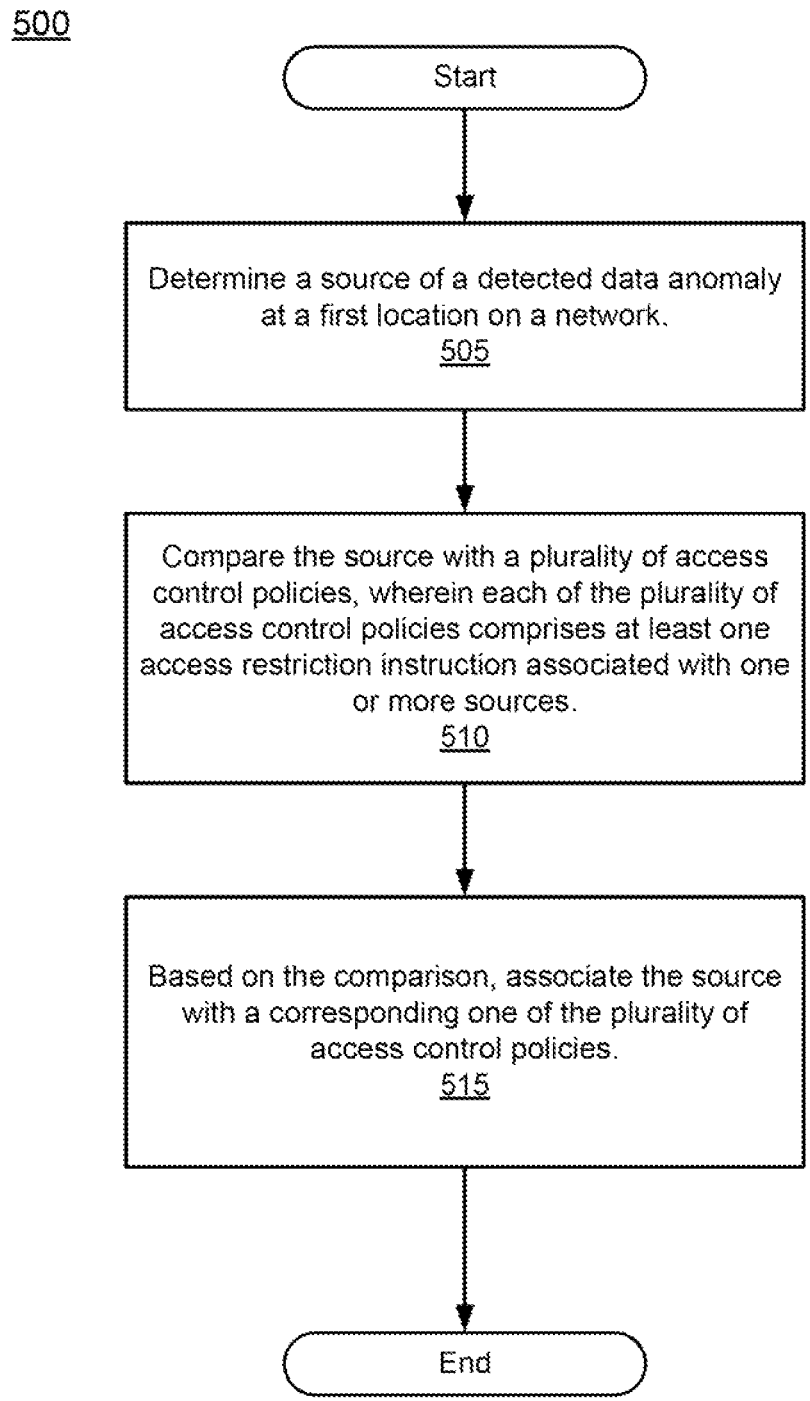
FIG. 5 is a flowchart of an example method of managing security in a network, in accordance with embodiments of the present technology.

FIG. 5 is a flowchart of an example method of managing security in a network, in accordance with embodiments of the present technology. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by NSS 111 of FIG. 2.

Referring to 505 of FIG. 5, in one embodiment, source 215 of a detected data anomaly 205 at a first location on network 100 is determined. In one embodiment, determining the source of detected data anomaly 205 comprises detecting data anomaly 205 at a first location on network 100 and identifying source 215 of data anomaly 205.

In one embodiment, identifying source 215 of data anomaly 205 comprises mapping source 215 to an associated network address 250. In one embodiment, identifying source 215 of data anomaly 205 comprises determining a role-based authentication of source 215.

Referring now to 510 of FIG. 5, in one embodiment and as described herein, source 215 is compared with plurality of access control policies 225a-225f, wherein each of plurality of access control policies 225a-225f comprises at least one access restriction instruction 235a-235f associated with one or more sources, such as but not limited to, 215.

Referring now to 515 of FIG. 5, in one embodiment and as described herein, based on the comparing described in 510 of FIG. 5, source 215 is associated with a corresponding one of plurality of access control policies 225a-225f. In one embodiment, a first access control policy is replaced with a second access control policy, such as 225a, wherein the second access control policy is based on the determining of source 215 described herein and in 505 of FIG. 5. First access control policy may be the original access control policy relating to source 215, or may be the most current access control policy relating to source 215. In other words, the second access control policy may override any previous access control policy in place.

Thus, embodiments of the present technology enable the prevention of continued harmful behavior on a network by providing a mechanism for detecting anomalous or harmful behavior by a user and/or a machine and restricting the user and/or the machine's future network access rights.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of managing security in a network, said method comprising:

detecting a data anomaly at a first location on a network;

identifying a source of said data anomaly;

determining a role-based authentication of said source, wherein said determining said role-based authentication of said source comprises:

determining a role associated with said source, wherein said role is a pre-defined function within said network, wherein said function corresponds to a level of access permitted to said source to various locations within said network;

comparing said source with a plurality of access control policies, wherein each of said plurality of access control policies comprises at least one access restriction instruction associated with one or more sources;

based on said comparing, associating said source with a corresponding one of said plurality of control policies, wherein said corresponding one of said plurality of control policies references at least said role of said source;

based on said identifying said source, replacing said corresponding one of said plurality of control policies with a second access control policy wherein said second access control policy overrides said corresponding one of said plurality of control policies and other previous access control policies in place; and enabling a prevention of re-entry of said source at a second location on said network based on a network address of said source and based on said role-based authentication of said source.

2. The method of claim 1, wherein said identifying a source of said data anomaly comprises:

mapping said source to an associated network address.

3. The method of claim 1, wherein said associating said source with a corresponding one of said plurality of control policies comprises:

enabling a duration restriction on said access.

4. The method of claim 1, wherein said associating said source with a corresponding one of said plurality of control policies comprises:

enabling a limiting of bandwidth usage by said source.

5. The method of claim 1, further comprising:

associating a temporary access control policy with said source.

6. The method of claim 1, further comprising:

associating a permanent access control policy with said source.

7. A non-transitory computer usable storage medium having computer readable program code embedded therein for a network security system, the program code comprising:

an anomaly detection module to detect a data anomaly at a first location on a network;

a source identifier to identify a source of said data anomaly;

a source authenticator to determine a role associated with said source, wherein said role is a pre-defined function within said network, wherein said function corresponds to a level of access permitted to said source to various locations within said network;

a data store to store a plurality of access control policies;

a source comparator to compare said source with said plurality of access control policies, wherein each of said plurality of access control policies comprises at least one access restriction instruction associated with one or more sources, and an access control policy associator to associate said source with a corresponding one of said plurality of access control policies based on said comparing, wherein said corresponding one of said plurality of control policies references at least said role of said source, and to replace said corresponding one of said plurality of control policies with a second access control policy based on said indentifying said source wherein said second access control policy overrides said corresponding one of said plurality of control policies and other previous access control policies in place and to prevent re-entry of said source at a second location on said network based on a network address of said source and based on said role-based authentication of said source.

8. The program code of claim 7, further comprising:
a mapping module configured for mapping said source to an associated network address.

9. The program code of claim 7, wherein said access restriction instruction comprises a network location restriction for said source.

10. The program code of claim 7, wherein said access restriction instruction comprises a network bandwidth restriction for said source at said second location.

11. The program code of claim 7, wherein said access restriction instruction comprises a duration restriction for said source at said second location.

12. A computer usable storage medium comprising instructions that when executed cause a computer system to perform a method of managing security in a network, said method comprising:
determining a source of a detected data anomaly at a first location on a network;
determining a role-based authentication of said source, wherein said determining said role-based authentication of said source comprises:
determining a role associated with said source, wherein said role is a pre-defined function within said network, wherein said function corresponds to a level of access permitted to said source to various locations within said network;
comparing said source with a plurality of access control policies, wherein each of said plurality of access control policies comprises at least one access restriction instruction associated with one or more sources;
based on said comparing, associating said source with a corresponding one of said plurality of access control policies, wherein said corresponding one of said plurality of control policies references at least said role of said source;
based on said determining said source, replacing said corresponding one of said plurality of control policies with a second access control policy wherein said second access control policy overrides said corresponding one of said plurality of control policies and other previous access control policies in place; and
enabling a prevention of re-entry of said source at a second location on said network based on a network address of said source and based on said role-based authentication of said source.

13. The computer usable storage medium of claim 12, wherein in said method, said determining comprises:
detecting a data anomaly at a first location on a network; and
identifying a source of said data anomaly.

14. The computer usable storage medium of claim 13, wherein in said method, said identifying comprises:
mapping said source to an associated network address.

* * * * *